(12) United States Patent
Dhuse et al.

(10) Patent No.: US 10,007,438 B2
(45) Date of Patent: Jun. 26, 2018

(54) METHOD AND SYSTEM FOR ACHIEVING CONSENSUS USING ALTERNATE VOTING STRATEGIES (AVS) WITH INCOMPLETE INFORMATION

(71) Applicant: International Business Machines Corporation, Armonk, NY (US)

(72) Inventors: Greg R. Dhuse, Chicago, IL (US);
Ravi V. Khadiwala, Bartlett, IL (US);
Ethan S. Wozniak, Park Ridge, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 55 days.

(21) Appl. No.: 15/193,024

(22) Filed: Jun. 25, 2016

(65) Prior Publication Data
US 2017/0371541 A1   Dec. 28, 2017

(51) Int. Cl.
*G06F 3/06* (2006.01)
*G06F 11/10* (2006.01)

(52) U.S. Cl.
CPC .............. *G06F 3/061* (2013.01); *G06F 3/067* (2013.01); *G06F 3/0619* (2013.01); *G06F 3/0659* (2013.01); *G06F 11/1076* (2013.01)

(58) Field of Classification Search
CPC .. G06F 11/1076; G06F 21/60; G06F 11/0727; G06F 11/2094; G06F 11/1464; G06F 3/0644; G06F 17/30194; G06F 2221/2107; G06F 2212/1032; G06F 11/1092; G06F 11/008; G06F 11/1088;
(Continued)

(56) References Cited

U.S. PATENT DOCUMENTS

| | | |
|---|---|---|
| 4,092,732 A | 5/1978 | Ouchi |
| 5,454,101 A | 9/1995 | Mackay et al. |
| 5,485,474 A | 1/1996 | Rabin |

(Continued)

OTHER PUBLICATIONS

Shamir; How to Share a Secret; Communications of the ACM; vol. 22, No. 11; Nov. 1979; pp. 612-613.

(Continued)

*Primary Examiner* — Adam M Queler
*Assistant Examiner* — Alex G Olson
(74) *Attorney, Agent, or Firm* — Garlick & Markison; Timothy W. Markison; Bruce E. Stuckman

(57) ABSTRACT

A computing device having interface, memory, and processing module, transmits write requests for a set of encoded data slices to storage units (SUs) of a dispersed storage network (DSN) based on a write request process and to receive proposal records for a subset of the set of encoded data slices from at least some of the SUs. The computing device interprets the proposal records to determine whether it or any another computing device has a threshold number of its respective write requests in a first priority position in the ordered list of pending write requests. When no computing device has the threshold number, the computing device determines whether any computing device can be blacklisted and/or eliminated and whether a winner of the ballot can be determined after such determination. When a winner is determined, the computing device transmits finalize commands to the storage units.

16 Claims, 9 Drawing Sheets

(58) Field of Classification Search
CPC . G06F 11/1612; G06F 17/3053; G06F 3/0689
See application file for complete search history.

(56) References Cited

U.S. PATENT DOCUMENTS

| | | | |
|---|---|---|---|
| 5,774,643 A | 6/1998 | Lubbers et al. | |
| 5,802,364 A | 9/1998 | Senator et al. | |
| 5,809,285 A | 9/1998 | Hilland | |
| 5,890,156 A | 3/1999 | Rekieta et al. | |
| 5,987,622 A | 11/1999 | Lo Verso et al. | |
| 5,991,414 A | 11/1999 | Garay et al. | |
| 6,012,159 A | 1/2000 | Fischer et al. | |
| 6,058,454 A | 5/2000 | Gerlach et al. | |
| 6,128,277 A | 10/2000 | Bruck et al. | |
| 6,175,571 B1 | 1/2001 | Haddock et al. | |
| 6,192,472 B1 | 2/2001 | Garay et al. | |
| 6,256,688 B1 | 7/2001 | Suetaka et al. | |
| 6,272,658 B1 | 8/2001 | Steele et al. | |
| 6,301,604 B1 | 10/2001 | Nojima | |
| 6,356,949 B1 | 3/2002 | Katsandres et al. | |
| 6,366,995 B1 | 4/2002 | Vilkov et al. | |
| 6,374,336 B1 | 4/2002 | Peters et al. | |
| 6,415,373 B1 | 7/2002 | Peters et al. | |
| 6,418,539 B1 | 7/2002 | Walker | |
| 6,449,688 B1 | 9/2002 | Peters et al. | |
| 6,567,948 B2 | 5/2003 | Steele et al. | |
| 6,571,282 B1 | 5/2003 | Bowman-Amuah | |
| 6,609,223 B1 | 8/2003 | Wolfgang | |
| 6,718,361 B1 | 4/2004 | Basani et al. | |
| 6,760,808 B2 | 7/2004 | Peters et al. | |
| 6,785,768 B2 | 8/2004 | Peters et al. | |
| 6,785,783 B2 | 8/2004 | Buckland | |
| 6,826,711 B2 | 11/2004 | Moulton et al. | |
| 6,879,596 B1 | 4/2005 | Dooply | |
| 6,904,470 B1* | 6/2005 | Ofer | G06F 3/061 710/6 |
| 7,003,688 B1 | 2/2006 | Pittelkow et al. | |
| 7,024,451 B2 | 4/2006 | Jorgenson | |
| 7,024,609 B2 | 4/2006 | Wolfgang et al. | |
| 7,080,101 B1 | 7/2006 | Watson et al. | |
| 7,103,824 B2 | 9/2006 | Halford | |
| 7,103,915 B2 | 9/2006 | Redlich et al. | |
| 7,111,115 B2 | 9/2006 | Peters et al. | |
| 7,140,044 B2 | 11/2006 | Redlich et al. | |
| 7,146,644 B2 | 12/2006 | Redlich et al. | |
| 7,171,493 B2 | 1/2007 | Shu et al. | |
| 7,222,133 B1 | 5/2007 | Raipurkar et al. | |
| 7,240,236 B2 | 7/2007 | Cutts et al. | |
| 7,272,613 B2 | 9/2007 | Sim et al. | |
| 7,636,724 B2 | 12/2009 | de la Torre et al. | |
| 8,285,878 B2* | 10/2012 | Gladwin | G06F 3/0617 709/203 |
| 2002/0062422 A1 | 5/2002 | Butterworth et al. | |
| 2002/0166079 A1 | 11/2002 | Ulrich et al. | |
| 2003/0018927 A1 | 1/2003 | Gadir et al. | |
| 2003/0037261 A1 | 2/2003 | Meffert et al. | |
| 2003/0065617 A1 | 4/2003 | Watkins et al. | |
| 2003/0084020 A1 | 5/2003 | Shu | |
| 2004/0024963 A1 | 2/2004 | Talagala et al. | |
| 2004/0122917 A1 | 6/2004 | Menon et al. | |
| 2004/0215998 A1 | 10/2004 | Buxton et al. | |
| 2004/0228493 A1 | 11/2004 | Ma et al. | |
| 2005/0100022 A1 | 5/2005 | Ramprashad | |
| 2005/0114594 A1 | 5/2005 | Corbett et al. | |
| 2005/0125593 A1 | 6/2005 | Karpoff et al. | |
| 2005/0131993 A1 | 6/2005 | Fatula, Jr. | |
| 2005/0132070 A1 | 6/2005 | Redlich et al. | |
| 2005/0144382 A1 | 6/2005 | Schmisseur | |
| 2005/0229069 A1 | 10/2005 | Hassner | |
| 2006/0047907 A1 | 3/2006 | Shiga et al. | |
| 2006/0136448 A1 | 6/2006 | Cialini et al. | |
| 2006/0156059 A1 | 7/2006 | Kitamura | |
| 2006/0224603 A1 | 10/2006 | Correll, Jr. | |
| 2007/0079081 A1 | 4/2007 | Gladwin et al. | |
| 2007/0079082 A1 | 4/2007 | Gladwin et al. | |
| 2007/0079083 A1 | 4/2007 | Gladwin et al. | |
| 2007/0088970 A1 | 4/2007 | Buxton et al. | |
| 2007/0174192 A1 | 7/2007 | Gladwin et al. | |
| 2007/0214285 A1 | 9/2007 | Au et al. | |
| 2007/0234110 A1 | 10/2007 | Soran et al. | |
| 2007/0283167 A1 | 12/2007 | Venters, III et al. | |
| 2009/0094251 A1 | 4/2009 | Gladwin et al. | |
| 2009/0094318 A1 | 4/2009 | Gladwin et al. | |
| 2010/0023524 A1 | 1/2010 | Gladwin et al. | |
| 2010/0218037 A1* | 8/2010 | Swartz | G06F 17/30 714/6.12 |
| 2011/0016122 A1* | 1/2011 | Motwani | H04L 67/1097 707/736 |
| 2011/0029711 A1* | 2/2011 | Dhuse | G06F 11/1076 711/4 |
| 2011/0029809 A1* | 2/2011 | Dhuse | G06F 11/1076 714/6.1 |
| 2011/0078080 A1* | 3/2011 | Grube | G06F 11/1076 705/44 |
| 2011/0314355 A1* | 12/2011 | Grube | G06F 11/1076 714/763 |
| 2013/0138706 A1* | 5/2013 | Dhuse | G06F 17/30194 707/827 |
| 2017/0262345 A1* | 9/2017 | Wang | G06F 11/1464 |

OTHER PUBLICATIONS

Rabin; Efficient Dispersal of Information for Security, Load Balancing, and Fault Tolerance; Journal of the Association for Computer Machinery; vol. 36, No. 2; Apr. 1989; pp. 335-348.

Chung; An Automatic Data Segmentation Method for 3D Measured Data Points; National Taiwan University; pp. 1-8; 1998.

Plank, T1: Erasure Codes for Storage Applications; FAST2005, 4th Usenix Conference on File Storage Technologies; Dec. 13-16, 2005; pp. 1-74.

Wildi; Java iSCSi Initiator; Master Thesis; Department of Computer and Information Science, University of Konstanz; Feb. 2007; 60 pgs.

Legg; Lightweight Directory Access Protocol (LDAP): Syntaxes and Matching Rules; IETF Network Working Group; RFC 4517; Jun. 2006; pp. 1-50.

Zeilenga; Lightweight Directory Access Protocol (LDAP): Internationalized String Preparation; IETF Network Working Group; RFC 4518; Jun. 2006; pp. 1-14.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Zeilenga; Lightweight Directory Access Protocol (LDAP): Directory Information Models; IETF Network Working Group; RFC 4512; Jun. 2006; pp. 1-49.

Sciberras; Lightweight Directory Access Protocol (LDAP): Schema for User Applications; IETF Network Working Group; RFC 4519; Jun. 2006; pp. 1-33.

Harrison; Lightweight Directory Access Protocol (LDAP): Authentication Methods and Security Mechanisms; IETF Network Working Group; RFC 4513; Jun. 2006; pp. 1-32.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): String Representation of Distinguished Names; IETF Network Working Group; RFC 4514; Jun. 2006; pp. 1-15.

Sermersheim; Lightweight Directory Access Protocol (LDAP): The Protocol; IETF Network Working Group; RFC 4511; Jun. 2006; pp. 1-68.

Satran, et al.; Internet Small Computer Systems Interface (iSCSI); IETF Network Working Group; RFC 3720; Apr. 2004; pp. 1-257.

Xin, et al.; Evaluation of Distributed Recovery in Large-Scale Storage Systems; 13th IEEE International Symposium on High Performance Distributed Computing; Jun. 2004; pp. 172-181.

(56) References Cited

OTHER PUBLICATIONS

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

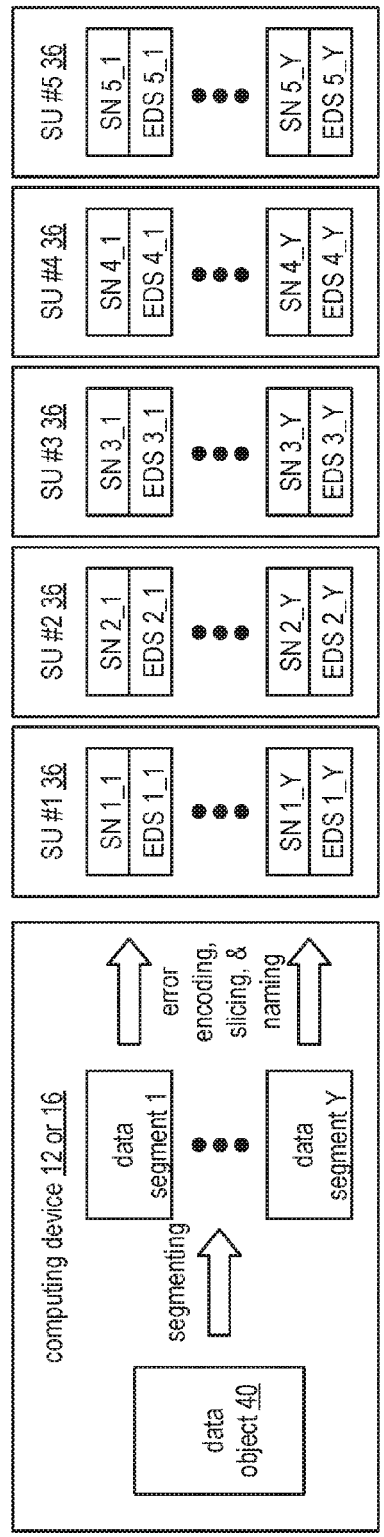
FIG. 3
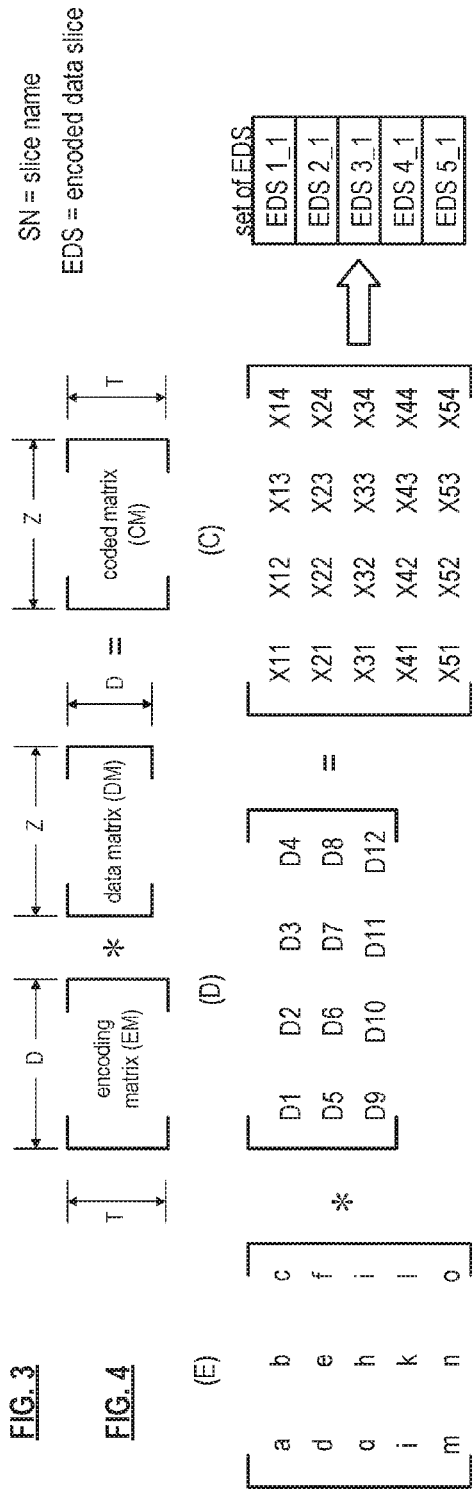
FIG. 4
FIG. 5
FIG. 6

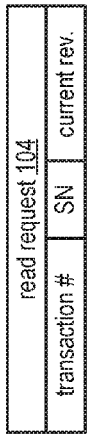
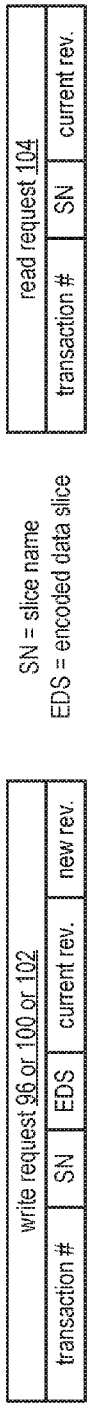
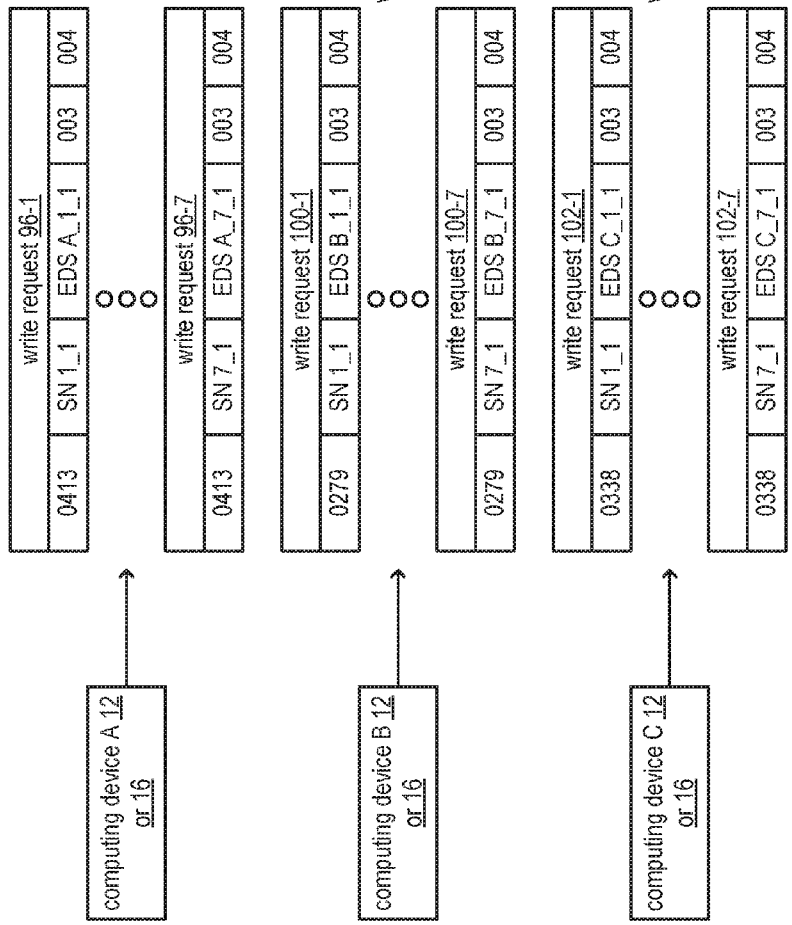

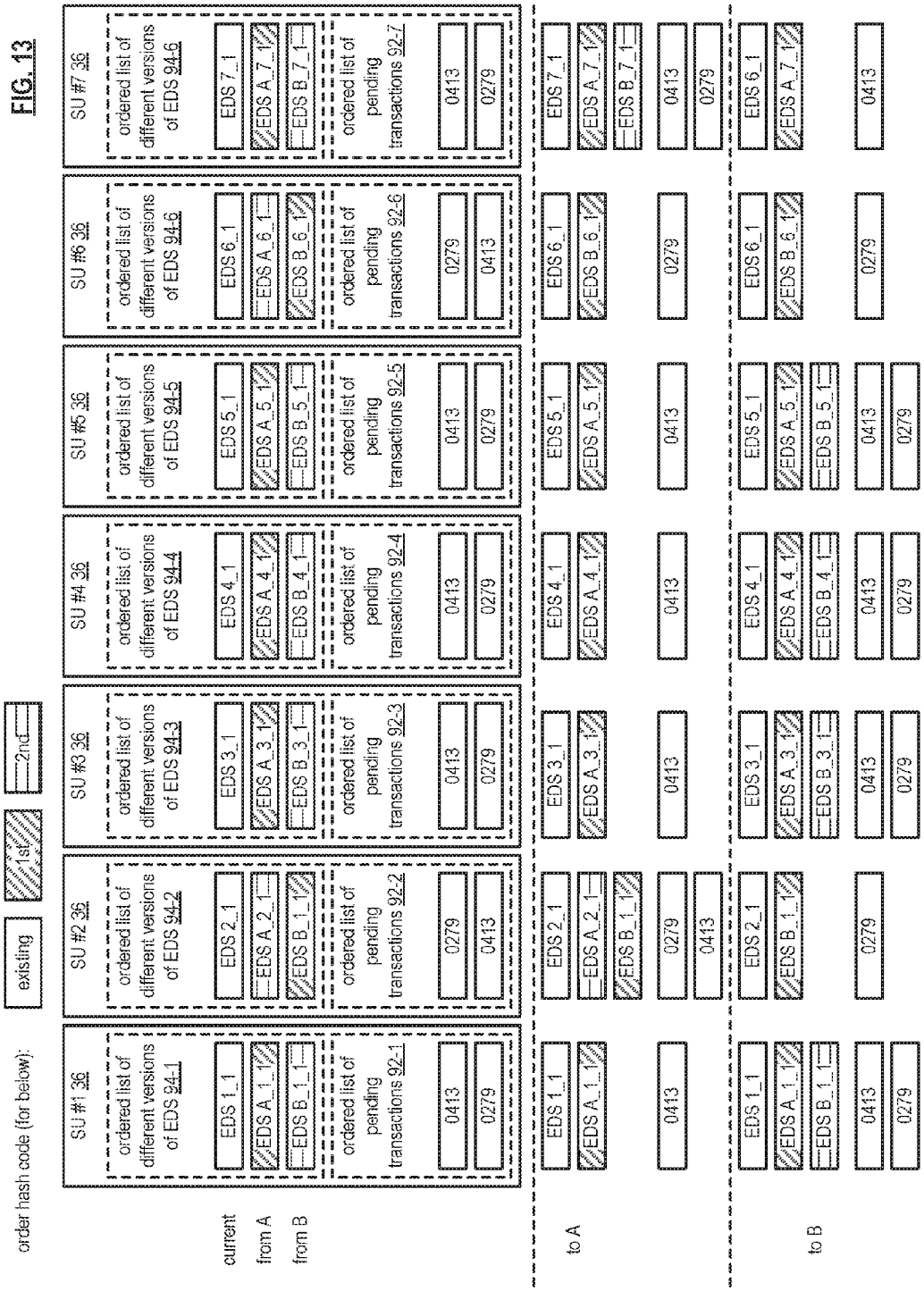

METHOD AND SYSTEM FOR ACHIEVING CONSENSUS USING ALTERNATE VOTING STRATEGIES (AVS) WITH INCOMPLETE INFORMATION

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

Within such systems that use cloud computing, different computing devices may attempt to write information to various other devices (e.g., computing devices, storage units, etc.) therein. There can be competing computing devices that attempt to write information to these various other devices (e.g., two different computing devices attempting to write information to a set of storage units), and the prior art does not provide adequate means by which decisions may be made regarding which requests from which of the different computing devices issuing the write requests will be approved and which will be denied. Also, the prior art does not provide adequate means to by such decisions may be made when responses to the write requests are not received from some of the storage units are not received.

BRIEF DESCRIPTION OF THE SEVERAL VIEWS OF THE DRAWING(S)

FIG. 3 is a schematic block diagram of an example of dispersed storage error encoding of data in accordance with the present invention;

FIG. 4 is a schematic block diagram of a generic example of an error encoding function in accordance with the present invention;

FIG. 5 is a schematic block diagram of a specific example of an error encoding function in accordance with the present invention;

FIG. 6 is a schematic block diagram of an example of a slice name of an encoded data slice (EDS) in accordance with the present invention;

FIG. 10 is a schematic block diagram of an example of a write request for an encoded data slice in accordance with the present invention;

FIG. 11 is a schematic block diagram of an example of a read request for an encoded data slice in accordance with the present invention;

FIG. 12 is a schematic block diagram of another example of overlapping write requests and read requests for a set of encoded data slices in accordance with the present invention;

FIG. 13 is a schematic block diagram of an example of proposal records for a set of encoded data slices stored by storage units of the DSN in accordance with the present invention;

DETAILED DESCRIPTION OF THE INVENTION

Figure 1:
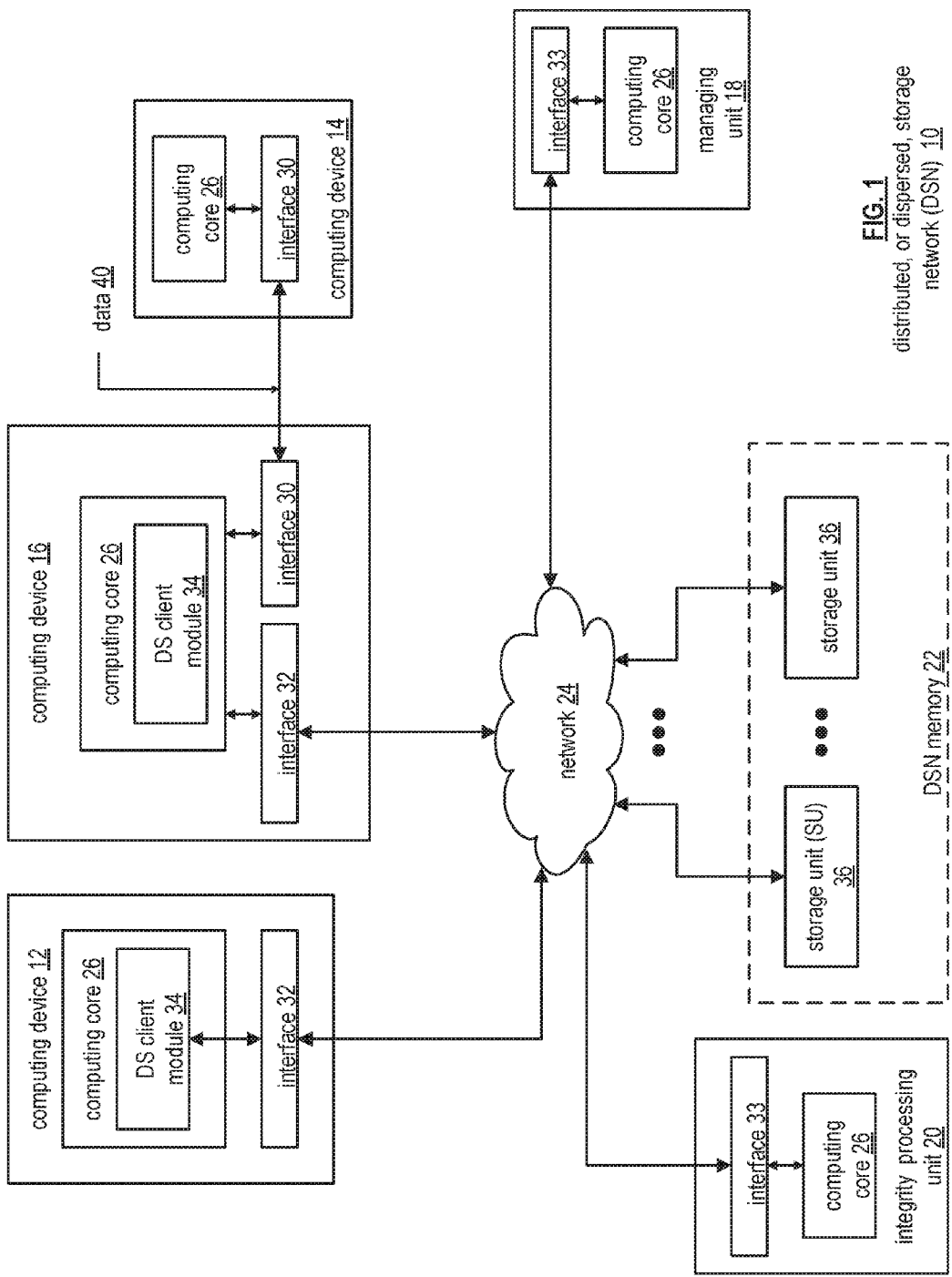
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
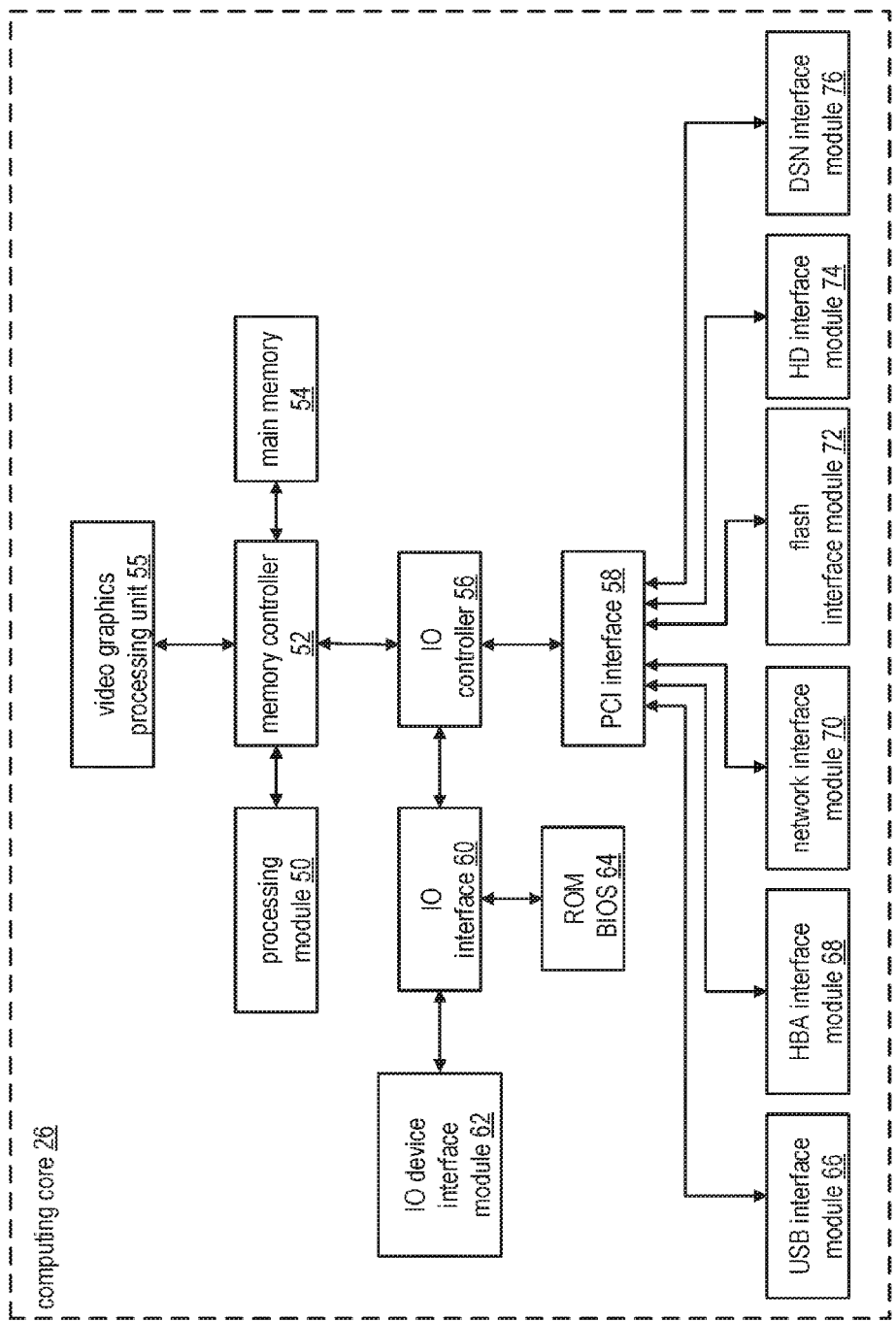
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN module 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76 that allows interfacing to other devices, components, storage units, and/or any other desired elements within the DSN.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Returning to the discussion of FIG. 3, the computing device also creates a slice name (SN) for each encoded data slice (EDS) in the set of encoded data slices. A typical format for a slice name 60 is shown in FIG. 6. As shown, the slice name (SN) 60 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figures 7, 8:
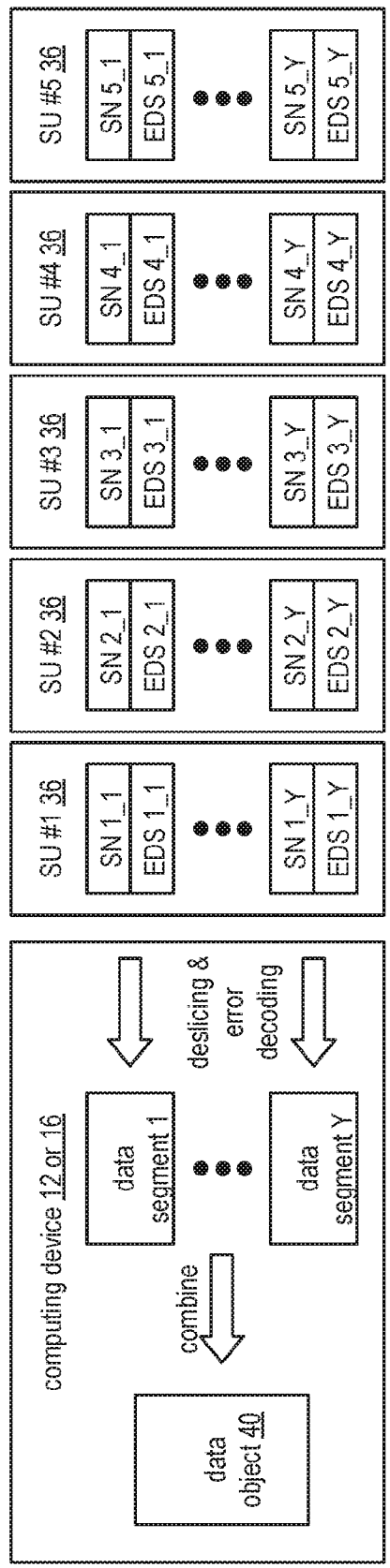
FIG. 7 is a schematic block diagram of an example of dispersed storage error decoding of data in accordance with the present invention.
FIG. 8 is a schematic block diagram of a generic example of an error decoding function in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
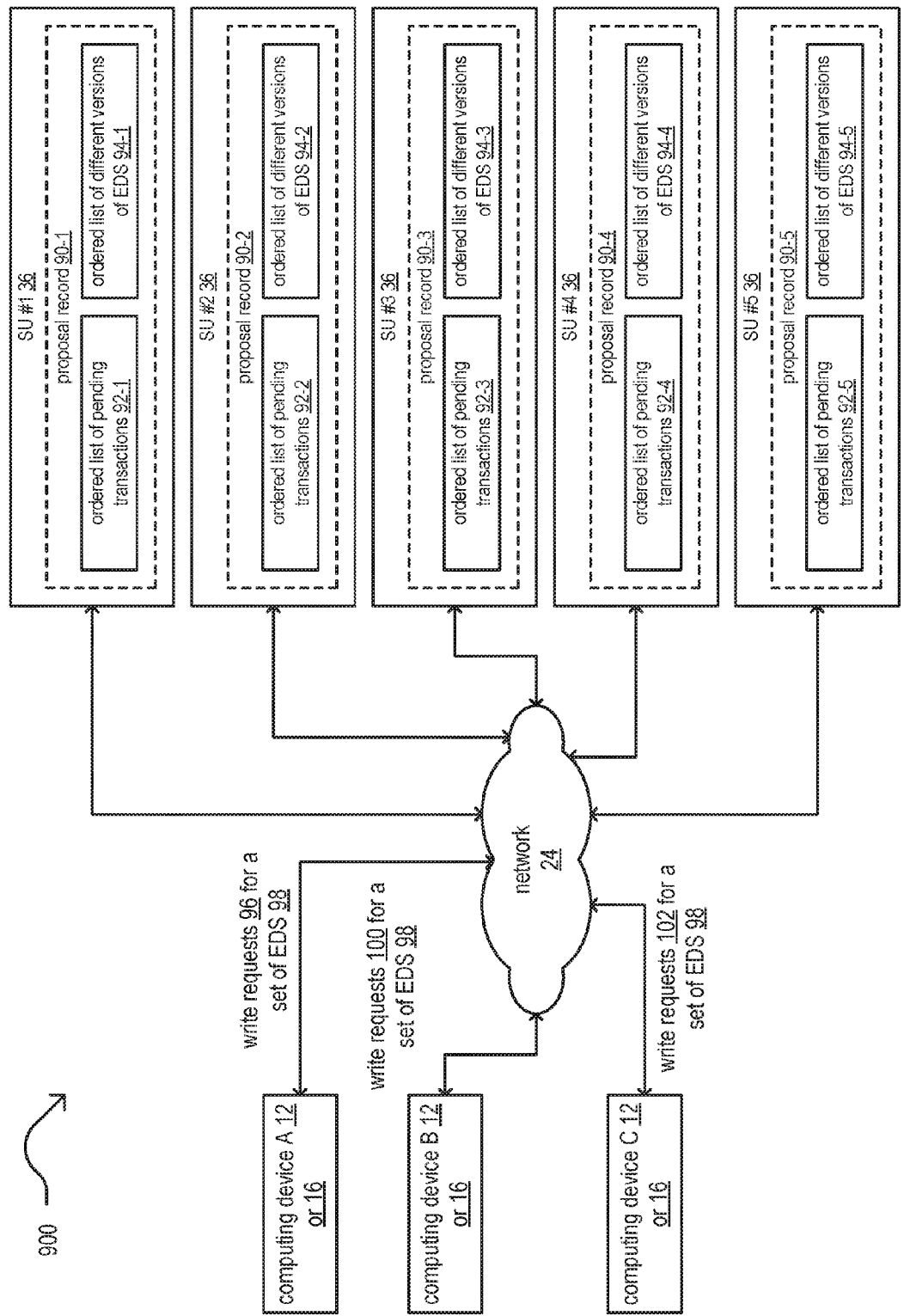
FIG. 9 is a schematic block diagram of an example of overlapping write requests for a set of encoded data slices in accordance with the present invention.

FIG. 9 is a schematic block diagram of an example of overlapping write requests for a set of encoded data slices having the same set of slice names. Overlapping write requests occur when one set of write requests is pending (e.g., write finalize commands have not yet been issued) and another set of write requests for a set of encoded data slices having the same set of slice names is received by the storage units. In this example, computing devices A and B send overlapping write requests regarding a set of encoded data slices with the same set of slices names.

To process overlapping write requests (and other overlapping data access requests), each storage unit 36 (SU #1-SU #5) stores its own proposal record 90-1 through 90-5 for a slice name or for a group of slice names. A proposal record 90 includes an order listed of pending transactions 92 and an ordered list of visible and different versions of an encoded data slice (EDS) 94 have the same slice name. The proposal record 90 may further include an indication of the current revision level of the encoded data slice.

The ordered list of pending transactions 92 include a time ordered list of transaction numbers, or other indication, associated with data access requests regarding the slice name that were received while the proposal record is open (e.g., write finalize commands have not yet been issued for one of the pending write requests). For example, the proposal record 90-1 of storage unit #1 includes an ordered list of transaction numbers for data access requests regarding a first slice name of a set of slice names.

As a specific example, a first write request from computing device A regarding a version of an encoded data slice having the first slice name has a first transaction number (e.g., 0413) and a second write request from computing device B regarding another version of the encoded data slice having the first slice name has a second transaction number (e.g., 0279). Storage unit #1 received the first write request before receiving the second write request, as such the proposal record 90-1 has the first write request (e.g., the first transaction number) in a first priority position and the second write request in a second priority position.

As another specific example, a write request from computing device A regarding a version of an encoded data slice having a second slice name has the first transaction number (e.g., 0413) and a write request from computing device B regarding another version of the encoded data slice having the second slice name has the second transaction number (e.g., 0279). Storage unit #2 received the write request from computing device B before receiving the write request from computing device A. As such, the proposal record 90-2 has the write request of computing device B (e.g., the second transaction number) in the first priority position and the write request from computing device A in a second priority position. The remaining storage units generate their respective proposal records in a similar manner.

In general, a storage unit "opens" a proposal record when it receives a new write request for a version of an encoded data slice having a slice name (i.e., no other write requests are pending). The storage unit sends to proposal record to the computing device sending the write request. If there are no overlapping write requests for a set of encoded data slices having a set of slice names, then the other storage units (SU #2-SU #5) open up proposal records and send them to the computing device.

The computing device interprets the proposal records to determine whether a threshold number, or more, (e.g., decode threshold number, write threshold number, etc.) of its write requests is in the first priority position. When there is not an overlapping write request, the write requests will be in the first priority position. As such, the computing device sends finalize requests to the storage units. The storage units process the finalize request to make the new version of the encoded data slices as the most recent set of encoded data slices and close their respective proposal records.

When there is an overlapping write request (e.g., a storage unit has an open proposal record for the slice name), the storage unit updates the proposal record with the new write request by placing the new write request is a lower priority position than previously received and pending write requests. After updating the proposal record, the storage unit sends the proposal record to the computing device that sent the new write request.

As the computing devices receive the proposal records, it determines whether at least the threshold number of their respective write requests are in first priority position. If yes, the computing device issues the finalize commands. If not, the computing device withdraws it write requests or executes some other fallback position.

In addition to the two write requests, computing device C is sending read requests to the storage units for the set of encoded data slices 98. The storage units add the read requests to their respective proposal records and send the updated proposal records to computing device C. Upon receiving the proposal records, computing device C determines whether to proceed with the read request (e.g., read the current revision level of the set of encoded data slices) or terminate the read request. As an alternative, computing device C processes the proposal records to determine that the new set of encoded data slices from computing device A or computing device B will be the next current version of the set of encoded data slices. Having made this determination, computing device C modifies its read requests to read the next current version of the set of encoded data slices.

FIG. 10 is a schematic block diagram of an example of a write request 96 or 100 that of FIG. 9. The write request includes a transaction number field, a slice name (SN) field, an encoded data slice (EDS) field, a current revision level field, and a new revision level field. Each write request in the set of write requests includes the same transaction number, a different slice name, a different EDS, the same current revision level, and the same new revision level.

FIG. 11 is a schematic block diagram of an example of a read request 104 such as may be performed instead of or in conjunction with the write requests of FIG. 9. The read request includes a transaction number field, a slice name (SN) field, and a current revision level field. Each read request in the set of read requests 104 includes the same transaction number, a different slice name, and the same current revision level.

FIG. 12 is a schematic block diagram of another example of overlapping write requests 96, 100, and 102 for a set of encoded data slices 98. In this example, each of computing devices A and B encodes a data segment into a set of seven encoded data slices. Accordingly, each of computing devices A, B, and C generates seven write requests 96-1 through 96-7, and 100-1 through 100-7, and 102-1 through 102-7. The write requests from computing device A include the same transaction number of 0413 (which may be randomly generated, may be a time stamp, etc.), differing slice names (SN 1_1 through SN 7_1), differing encoded data slices (EDS A_1_1 through EDS A_7_1), the same current revision level of 003, and the next revision level of 004.

The write requests form computing device B include the same transaction number of 0279, differing slice names (SN 1_1 through SN 7_1), differing encoded data slices (EDS B_1_1 through EDS B_7_1), the same current revision level of 003, and the next revision level of 004. A comparison of the write requests from computing device A with the write requests from computing device B yields that the write requests have the same slice names, the same current revision levels, and the same next revision levels. The write requests differ in the transaction numbers and in the encoded data slices.

The write requests form computing device C include the same transaction number of 0338, differing slice names (SN 1_1 through SN 7_1), differing encoded data slices (EDS C_1_1 through EDS C_7_1), the same current revision level of 003, and the next revision level of 004. A comparison of the write requests from computing device A with the write requests from computing device B and the computing device C yields that these write requests also have the same slice names, the same current revision levels, and the same next revision levels. The write requests differ in the transaction numbers and in the encoded data slices.

The write requests are sent to the storage units SU #1 through SU #7, which processes the write requests as discussed with reference to FIG. 13.

FIG. 13 is a schematic block diagram of an example of proposal records for a set of encoded data slices stored by storage units of the DSN. In this example, while the write requests 96, 100, and 102 are sent out at similar times, due to differing latencies and/or processing capabilities between the computing devices and storage units, the write requests are received at different times and, potentially in a different order, by the storage units than the order in which they were transmitted from the respective computing devices A, B, and C.

The processing and operations of write requests from two computing devices A, B is used below for illustration. Such processing can be extended to more than two computing devices (e.g., two computing devices A, B, and C) without departing from the scope and spirit of the invention. For examples, the principles described with respect to two computing devices A, B can be extended generally to any number of N computing devices, where N is any positive integer greater than or equal to 2.

Prior to the reception of any of the write requests, the storage units store a current revision level of the set of encoded data slices. As shown, storage unit SU #1 stores EDS 1_1, storage unit SU #2 stores EDS 2_1, and so on. In this example, the current revision level of the encoded data slices is 003. In addition, each of the storage units do not have a proposal record open for their respective encoded data slice.

In this example, when a storage unit receives a write request, it generates a proposal record that includes an ordered list of pending write requests including those that may be received from multiple respective computing devices (e.g., from any one or more of the computing devices A, B, and C). Upon generating the proposal record in response to the write request(s), the storage unit sends the proposal record to the computing device from which it received the request.

For example, each of storage units 1, 3, 4, 5, and 7 received the write request from computing device A first. Accordingly, each storage unit creates a proposal record that includes the ordered list of pending transactions 92 and the order list of visible different versions of EDS 94, which is sent to computing device A. For instance, each of the ordered list of pending transactions 92-1, 92-3, 92-4, 92-5, and 92-7 include the transaction number of 0413 (the transaction number for the write requests of computing device A) in the first priority position. Further, each of the order list of visible different versions of EDS 92-1, 92-3, 92-4, 92-5, and 92-7 includes an indication that the current revision level of the encoded data slice and the encoded data slice from computing device A are visible (e.g., for SU #1, EDS 1_1 and EDS A_1_1 are visible).

Continuing with the example, storage unit #2 and storage unit #6 receive the write request from computing device B first. Accordingly, storage unit #2 and storage unit #6 create a proposal record that includes the ordered list of pending transactions 92-2 and 92-7, respectively, and the order list of visible different versions of EDS 94-4, which is sent to computing device B. For instance, the ordered list of pending transactions 92-2 and 92-6 include the transaction number of 0279 (the transaction number for the write requests of computing device B) in the first priority position. Further, the order lists of visible different versions of EDS 94-2 and 94-6 include an indication that the current revision level of the encoded data slice and the encoded data slice from computing device B are visible (e.g., EDS 2_1 and EDS B_2_1 are visible in storage unit #2 and EDS 6_1 and EDS B_6_1 are visible in storage unit #6).

After receiving the write requests from computing device A, storage units 1, 3, 4, 5, and 7 receive the write request from computing device B. Accordingly, each storage unit updates its proposal record, which are sent to computing device A. For instance, each of the ordered list of pending transactions 92-1, 92-3, 92-4, 92-5, and 92-7 are updated to include the transaction number of 0279 (the transaction number for the write requests of computing device B) in the second priority position. Further, each of the order list of visible different versions of EDS 92-1, 92-3, 92-4, 92-5, and 92-7 are updated to include an indication that the current revision level of the encoded data slice and the encoded data slices from computing devices A and B are visible (e.g., for SU #1, EDS 1_1 EDS A_1_1, and EDS B_1_1 are visible).

After receiving the write requests from computing device B, storage units 2 and 6 receives the write request from computing device A. Accordingly, storage unit #2 and storage unit #6 update their respective proposal records, which are sent to computing device B. For instance, the ordered list of pending transactions 92-2 and 92-6 includes the transaction number of 0413 (the transaction number for the write requests of computing device A) in the second priority position. Further, the order lists of visible different versions of EDS 94-2 and 94-6 include an indication that the current revision level of the encoded data slice and the encoded data slices from computing devices A and B are visible (e.g., for EDS 2_1, EDS B_2_1, and EDS A_2_1 are visible in SU #2 and EDS 6_1, EDS B_6_1, and EDS A_6_1 are visible in SU #6).

After receiving the write requests from both computing devices A and B, the storage units update their respective proposal records to indicate which of the write requests have received and in which priority position they are received (e.g., write request from computing device A in the first priority position and the write request from computing device B in the second priority position within the proposal record of storage unit #1, and so on). Each of the respective storage units then transmits its respective proposal record to the computing devices A and B. The computing devices A and B process the proposal records as previously discussed and/or as described with reference to FIGS. 14 and 15.

Also, note that each of the computing devices A and B may not necessarily receive all of the proposal records sent from all of the storage units (e.g., lost in transmission, corrupted and unable to be deciphered, deleteriously affected by noise, interference, etc. and/or for any other reason). For example, a given computing device (e.g., computing device A) may only receive some of the proposal records sent from some of the storage units, and that computing device can nonetheless process that incomplete information to determine whether or not its write requests (and which of them) will be successful or not. Similarly, other of the computing device may even receive only some of the proposal records sent from some of the storage units, and this may include a different subset of the proposal records sent from a different subset of the storage units than was received by another computing device. Each of the respective computing devices may not receive the same proposal records from the same computing devices. In general, any combination of proposal records sent from the respective storage units may be received by the various computing devices that have sent write requests to the storage units.

Figure 14:
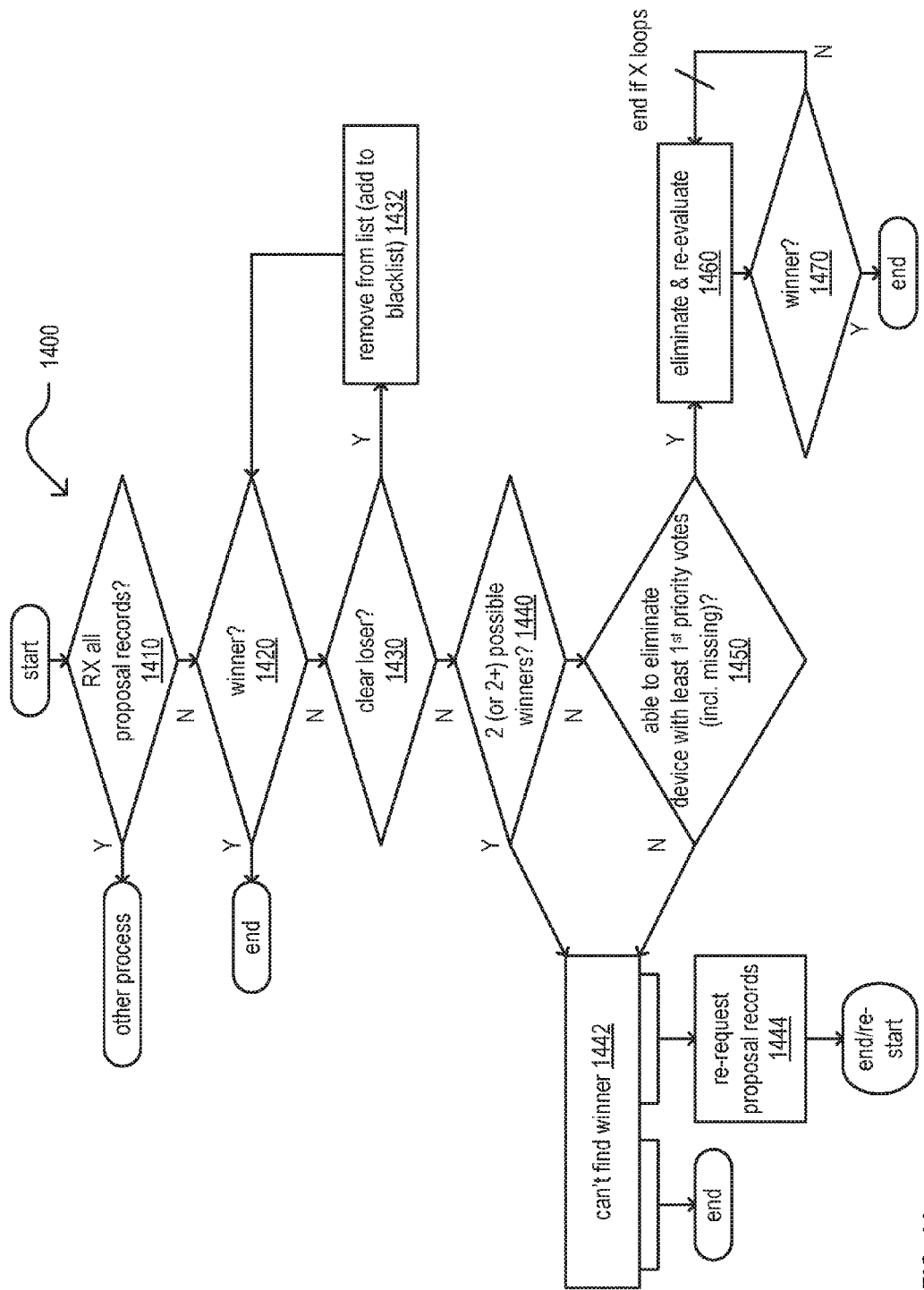
FIG. 14 is a logic diagram of an example method of processing proposal requests received in response to write requests in accordance with the present invention.

FIG. 14 is a logic diagram of an example method 1400 of processing proposal requests received in response to write requests in accordance with the present invention. The method 1400 can operate to identify a winner of a ballot of proposal records received from storage units even when fewer than all proposal records are received from all storage units to which a computing device sends write requests. For example, when competing computing devices sent write requests to the same set of storage units, various aspects of the invention allow for a determination of which of the computing devices write requests wins the ballot, and indicate which of the other computing device's write requests did not win the ballot. In some situations, no winner can be identified and the process ends/quits, re-sets, re-starts, or performs some other operation.

After transmitting write requests to storage units (e.g., a set of storage units), the method 1400 operates by determining whether all proposal records are received from all of the storage units to which write requests were sent (block 1410). If all proposal records are received from all storage units, the method 1400 branches to another process. Alternatively, if fewer than all proposal records are received from the storage units, the method 1400 branches to determine whether a winner can be determined based on those proposal records (e.g., fewer than all of the proposal records) that have been received (e.g., a clear winner, a clear majority of proposal records indicating a given computing device has its write requests listed in the first priority position). If a winner can be identified based on the fewer than all of the proposal records that have been received, then the method 1400 determines the winner and ends.

However, if no clear winner can be identified, then the method 1400 branches to determine whether a clear loser can be identified. For example, if these fewer than all of the proposal records that have been received include information that write requests from a given computing device cannot even win the ballot even based on non-received proposal records. When such a clear loser can be identified, that respective computing device is removed from the list of possible computing devices that could win the ballot (e.g., added to a blacklist) (block 1432), and the method 1400 performs the determination of block 1420 again with the reduced set of computing devices considered (e.g., an updated list with the blacklisted computing device excluded there from).

Alternatively, when no clear loser can be identified (block 1430), the method 1400 branches to determine whether there are 2 or more (e.g., 2 or 2+) possible winners (block 1440), and if so, the method branches to determine that a winner cannot be found (e.g., block 1442), from which the method 1400 ends or performs a re-request for the proposal records from the storage units (block 1444) in an effort to identify (hopefully) a winner of another ballot based on another sets of proposal records.

When there are not 2 or more (e.g., 2 or 2+) possible winners (block 1440), the method 1400 branches to determine whether it is able to eliminate any computing device with a least number of first priority votes (e.g., including any considering any missing proposal records not received from any of the computing devices) (block 1450). If no computing device can be eliminated based on analysis of the proposal records in this step (block 1450), the method 1400 branches to determine that a winner cannot be found (e.g., block 1442), from which the method 1400 ends or performs a re-request for the proposal records from the storage units (block 1444) in an effort to identify (hopefully) a winner of another ballot based on another sets of proposal records.

Alternatively, when a given computing device can be eliminated based on analysis of the proposal records in this step (block 1450), the method 1400 branches to eliminate that given computing device and re-evaluates the proposal records based on that given computing device being eliminated there from (block 1460). The method 1400 then determines whether a winner can be identified based on that analysis in that step (block 1470), and is yes, then the method 1400 identifies the winner and ends. Alternatively, the method 1400 can loop back and eliminate another given computing device and re-evaluate the proposal records based on that given computing device being eliminated there from (block 1460). This looping process can be performed until a winner is eventually based on that analysis in that step (block 1470). Note that if the loop actually loops a particular number of times (e.g., X times, which may be selectable, programmable based on any one or more considerations), the method 1400 may end if no winner can be identified even after those particular number of attempts.

In some of the following examples, consider 7 storage units and 5 being a decode threshold number of encoded data slices that is required for reconstruction of a a data segment that has been dispersed error encoded to produce a set of encoded data slices (e.g., that includes 7 encoded data slices).

For an example, consider that proposal records, in response to write requests, are received from 5 of the storage units (and none received from 2 of the storage units), and the write requests associated with computing device A are indicated to be in the first priority position for all 5 of the proposal records, and the write requests associated with computing device B are indicated to be in the first priority position for none of the proposal records. In this situation, a clear winner of computing device A can be identified even though fewer than all of the proposal records have been received.

For another example, consider that proposal records, in response to write requests, are received from 4 of the storage units (and none received from 3 of the storage units), and the write requests associated with computing device A are indicated to be in the first priority position for 2 of the proposal records, and the write requests associated with computing device B are indicated to be in the first priority position for 2 of the proposal records. In this situation, no clear winner can be identified and depending on which computing device the 3 outstanding proposal records may indicate, either the computing device A or the computing device B could be the winner. In this situation, no computing device can be put on the blacklist, and the method 1400 may operate to perform the operation associated with block 1442 and following.

For another example, consider that proposal records, in response to write requests, are received from 4 of the storage units (and none received from 3 of the storage units), and the write requests associated with computing device A are indicated to be in the first priority position for 3 of the proposal records, and the write requests associated with computing device B are indicated to be in the first priority position for 1 of the proposal records. In this situation, the computing device A has an actual number of the first priority positions of the respective write requests (3) that is more than the number of missing proposal records (2) less than the threshold number (5). In this situation, the computing device B could never reach the threshold number of 5 even if the missing 2 proposal records indicated computing device B in the first priority position. As such, the computing device B can be put on the blacklist/removed from the list and all computing devices (including computing device B) will know that computing device B cannot win and has been blacklisted. Computing device B may perform various operations such as a write undo command, etc.

For another example, consider that proposal records, in response to write requests, are received from 5 of the storage units (and none received from 2 of the storage units), and the write requests associated with computing device A are indicated to be in the first priority position for 3 of the proposal records, and the write requests associated with computing device B are indicated to be in the first priority position for 2 of the proposal records. In this situation, even if the non-responding storage units (e.g., consider storage units 6 and 7) don't respond, computing device B can be removed because it can never reach the threshold number. This allows the weeding out of computing device B from the list (e.g., eliminating the device with the least first priority votes, including missing). Then, the proposal records may be re-evaluated to determine whether a winner can be identified. In general, when at least 5 of the 7 proposal records are received, then at least one of the computing devices can be weeded out. Once a computing device is weeded out, then the method 1400 can continues to try to find a winner with the remaining computing devices.

From other perspectives, the method 1400 operates by beginning with a set of "ballots" and a "blacklist". A ballot is a ranked from all of the proposal records received from the computing devices ordering of votes for candidates, and a blacklist is a set of candidates determined to have no possibility of winning. Then, if any computing device has its respective write records listed in the first priority positions in the received proposal records that include a majority, then that computing device is deemed the winner, and that ends the evaluation cycle.

Alternatively, the method 1400 determines whether it is possible that any two or more computing devices candidates could have their respective write requests in the majority given the currently missing information (e.g., missing proposal records). If such a computing device can be identified, and if it is not yet possible to determine a winning computing device, then the method 1400 can seek additional information (e.g., request a new set of ballots) or end.

In another alternative, the method 1400 determine that the set of candidates that could might have the least first-place positioned write requests within the proposal records, accounting for currently missing information (e.g., missing proposal records). If this set of proposal records contains only a single computing device identified therein, then that computing device is added to the blacklist and the proposal records are re-evaluated by generating a new ballot that is an updated ranked from all of the proposal records received from the computing devices ordering of votes for candidates excluding the computing device that has been blacklisted.

Otherwise, for each possibly losing candidate, the method 1400 is performed with that respective computing device added to the blacklist. Based on this, if all evaluations produce the same winning computing device, then that particular computing device is determined. 5b. Otherwise, it is not yet possible to determine a winning computing device, then the method 1400 can operate to seek additional information (e.g., request a new set of ballots) or end.

Figure 15:
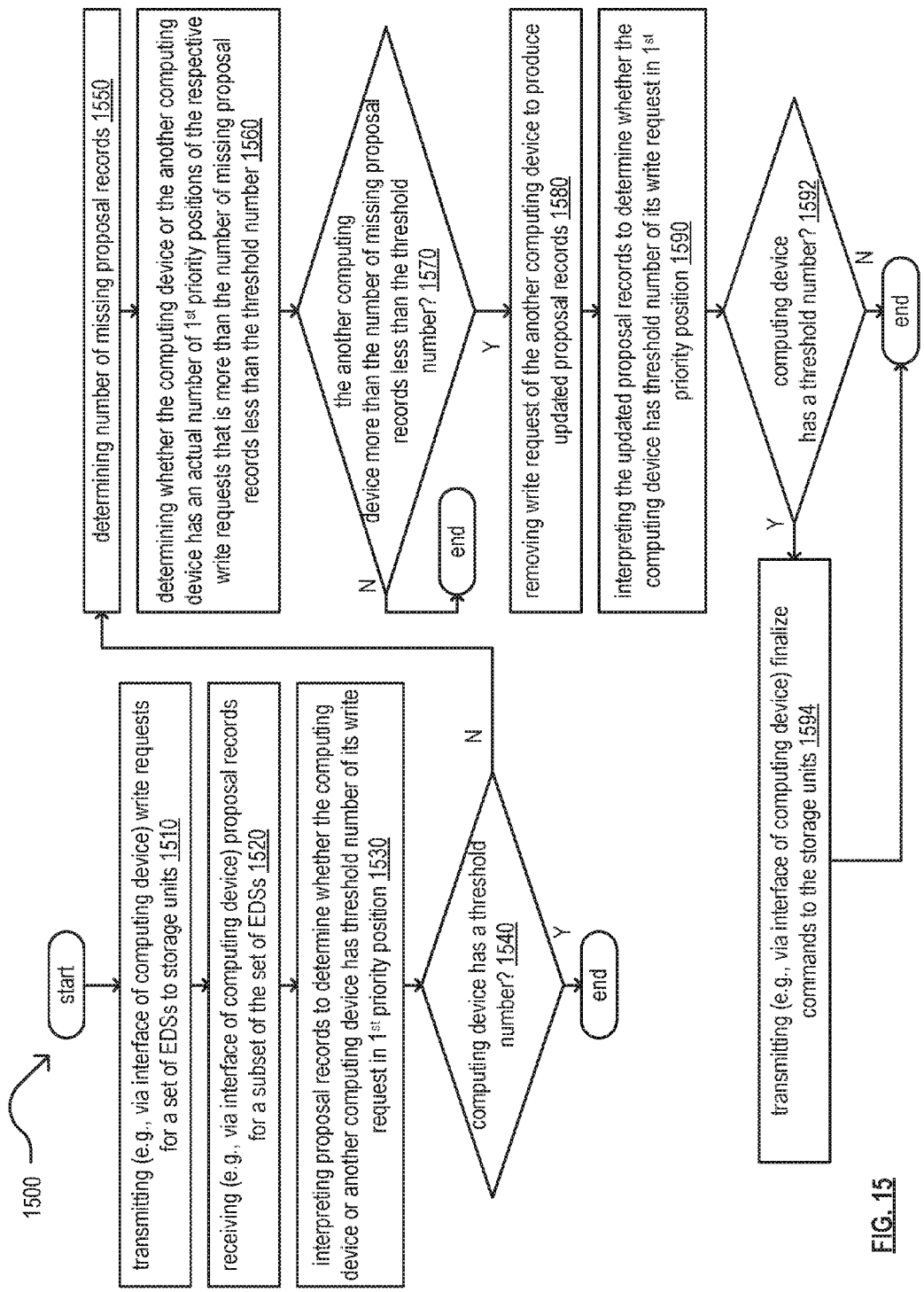
FIG. 15 is a logic diagram of another example method of processing proposal requests received in response to write requests in accordance with the present invention.

FIG. 15 is a logic diagram of another example method 1500 of processing proposal requests received in response to write requests in accordance with the present invention. The method 1500 begins by transmitting (e.g., via an interface of the computing device that is configured to interface with a dispersed storage network (DSN)), write requests for a set of encoded data slices to storage units (SUs) of a dispersed storage network (DSN) based on a write request process (block 1510). Note that a data segment is dispersed error encoded to produce the set of encoded data slices. Also, note that a threshold number of encoded data slices provides for reconstruction of the data segment, and each write request of the write requests corresponds to a respective one data slice of the set of encoded data slices and is transmitted to a respective one SU of the SUs.

The method continues by receiving (e.g., via the interface of the computing device) proposal records for a subset of the set of encoded data slices from at least some of the SUs (block 1520). A proposal record of the proposal records includes an ordered list of pending write requests including one of the write requests and another write request from another computing device.

The method then operates by interpreting the proposal records to determine whether the computing device or the other computing device has a threshold number of its respective write requests in a first priority position in the ordered list of pending write requests (block 1530).

When one of the computing device nor the other computing device has the threshold number of its respective write requests in the first priority position (block 1540), the method 1500 branches to end having identified a winner of the ballot.

When neither of the computing device nor the other computing device has the threshold number of its respective write requests in the first priority position (block 1540), the method 1500 branches to determining a number of missing proposal records (block 1550). The method 1500 then operates by determining whether either the computing device or the other computing device has an actual number of the first priority positions of the respective write requests that is more than the number of missing proposal records less than the threshold number (block 1560).

The method 1500 then operates to determine whether the other computing device has the actual number of the first priority positions of the respective write requests that is more than the number of missing proposal records less than the threshold number (block 1570). When it does not (block 1570), the method 1500 branches and ends. Alternatively, when the other computing device has the actual number of the first priority positions of the respective write requests that is more than the number of missing proposal records less than the threshold number (block 1570), the method 1500 operates by effectively removing the other write request from the other computing device from the proposal requests to produce updated proposal records (block 1580) and interpreting the updated proposal records to determine whether the computing device has the threshold number of write requests in the first priority position (block 1590).

The method 1500 then operates by determining whether the computing device has the threshold number of write requests in the first priority position of the updated proposal records (block 1592). When it does not (block 1592), the method 1500 branches and ends. Alternatively, when the computing device has the threshold number of write requests in the first priority position of the updated proposal records, the method 1500 operates by transmitting (e.g., via the interface of the computing device) finalize commands to the storage units having been determined to be the winner of the ballot.

In even other examples, the method 1500 may operate by requesting a new set of proposal records from the SUs based on the write requests when both the computing device and the other computing device have the actual number of the first priority positions of the respective write requests that is equal to or less than the number of missing proposal records less than the threshold number.

In some situations, the method 1500 also operates by aborting the write request process when both the computing device and the other computing device have the actual number of the first priority positions of the respective write requests that is equal to or less than the number of missing proposal records less than the threshold number.

In even other situations, the method 1500 may operate by transmitting (e.g., via the interface of the computing device) new write requests for the set of encoded data slices to SUs of the DSN based on another write request process.

Also, when neither the computing device nor the other computing device has the actual number of the first priority positions of the respective write requests that is equal to or less than the number of missing proposal records less than the threshold number and when the other computing device's actual number plus the number of missing proposal records is less than the computing device's actual number plus the number missing proposal records, the method 1500 may operate effectively removing the other write request from the other computing device from the proposal requests to produce other updated proposal records and interpreting the other updated proposal records.

In an alternative implementation, the method 1500 operates by receiving (e.g., via the interface of the computing device) the proposal records for the subset of the set of encoded data slices from at least some of the SUs, wherein a first proposal record of the proposal records includes a first ordered list of pending write requests including one of the write requests and a first other write request from a first other computing device, and wherein a second proposal record of the proposal records includes a second ordered list of pending write requests including another one of the write requests and a second other write request from a second other computing device. The method then continues by interpreting the proposal records to determine whether the computing device, the first other computing device, or the second other computing device has the threshold number of its respective write requests in a first priority position in the ordered list of pending write requests. When none of the computing device, the first other computing device, or the second other computing device has the threshold number of its respective write requests in the first priority position, the method 1500 operates by determining the number of missing proposal records and then determining whether any of the computing device, the first other computing device, or the second other computing device has the actual number of the first priority positions of the respective write requests that is more than the number of missing proposal records less than the threshold number. When each of the first other computing device and the second other computing device have the actual number of the first priority positions of the respective write requests that is more than the number of missing proposal records less than the threshold number, the method 1500 then operates by effectively removing the first other write request from the first other computing device from the proposal requests to produce first updated proposal records and interpreting the first updated proposal records. The method 1500 then operates by effectively removing the second other write request from the second other computing device from the proposal requests to produce second updated proposal records and interpreting the second updated proposal records. When interpretation of the first updated proposal records and the second updated proposal records both identify the computing device as having the threshold number of write requests in the first priority position of the updated proposal records, the method 1500 operates by transmitting (e.g., via the interface of the computing device) finalize commands to the storage units.

In some situations, the method 1500 also operates by receiving (e.g., via the interface of the computing device) a first proposal record of the proposal records from a first SU that is remotely located from the computing device within the DSN and a second proposal record of the proposal records from a second SU that is remotely located from the computing device and the first SU within the DSN.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A computing device comprising:
   an interface configured to interface with a dispersed storage network (DSN);
   a memory; and
   a processing module operably coupled to the interface and to the memory, wherein the processing module is configured to:
   transmit, via the interface, write requests for a set of encoded data slices to storage units (SUs) of a dispersed storage network (DSN) based on a write request process, wherein a data segment is dispersed error encoded to produce the set of encoded data slices, wherein a threshold number of encoded data slices provides for reconstruction of the data segment, wherein each write request of the write requests corresponds to a respective one data slice of the set of encoded data slices and is transmitted to a respective one SU of the SUs;
   receive, via the interface of the computing device, proposal records for a subset of the set of encoded data slices from at least some of the SUs, wherein a proposal record of the proposal records includes an ordered list of pending write requests including one of the write requests and another write request from another computing device;
   interpret the proposal records to determine whether the computing device or the other computing device has a threshold number of its respective write requests in a first priority position in the ordered list of pending write requests;
   when neither of the computing device nor the other computing device has the threshold number of its respective write requests in the first priority position:
      determine a number of missing proposal records;
      determine whether either the computing device or the other computing device has an actual number of the first priority positions of the respective write requests that is more than the number of missing proposal records less than the threshold number;
      when the other computing device has the actual number of the first priority positions of the respective write requests that is more than the number of missing proposal records less than the threshold number:
         remove the other write request from the other computing device from the proposal requests to produce updated proposal records;
         interpret the updated proposal records to determine whether the computing device has the threshold number of write requests in the first priority position; and
         when the computing device has the threshold number of write requests in the first priority position of the updated proposal records, transmit, via the interface, finalize commands to the storage units.

2. The computing device of claim 1, wherein the processing module is further configured to:
   transmit, via the interface, finalize commands to the storage units when the computing device has the threshold number of its respective write requests in the first priority position in the proposal records.

3. The computing device of claim 1, wherein the processing module is further configured to:
   request a new set of proposal records from the SUs based on the write requests when both the computing device and the other computing device have the actual number of the first priority positions of the respective write requests that is equal to or less than the number of missing proposal records less than the threshold number.

4. The computing device of claim 1, wherein the processing module is further configured to:
   abort the write request process when both the computing device and the other computing device have the actual number of the first priority positions of the respective write requests that is equal to or less than the number of missing proposal records less than the threshold number.

5. The computing device of claim 4, wherein the processing module is further configured to:
   transmit, via the interface, new write requests for the set of encoded data slices to SUs of the DSN based on another write request process.

6. The computing device of claim 1, wherein the processing module is further configured to:
   when neither the computing device nor the other computing device has the actual number of the first priority positions of the respective write requests that is equal to or less than the number of missing proposal records less than the threshold number and when the other computing device's actual number plus the number of missing proposal records is less than the computing device's actual number plus the number missing proposal records:
      remove the other write request from the other computing device from the proposal requests to produce other updated proposal records; and
      interpret the other updated proposal records.

7. The computing device of claim 1, wherein the processing module is further configured to:
   receive, via the interface, the proposal records for the subset of the set of encoded data slices from at least some of the SUs, wherein a first proposal record of the proposal records includes a first ordered list of pending write requests including one of the write requests and a first other write request from a first other computing device, and wherein a second proposal record of the proposal records includes a second ordered list of pending write requests including another one of the write requests and a second other write request from a second other computing device;
   interpret the proposal records to determine whether the computing device, the first other computing device, or the second other computing device has the threshold number of its respective write requests in a first priority position in the ordered list of pending write requests;
   when none of the computing device, the first other computing device, or the second other computing device has the threshold number of its respective write requests in the first priority position:
      determine the number of missing proposal records;
      determine whether any of the computing device, the first other computing device, or the second other computing device has the actual number of the first priority positions of the respective write requests that is more than the number of missing proposal records less than the threshold number;

when each of the first other computing device and the second other computing device have the actual number of the first priority positions of the respective write requests that is more than the number of missing proposal records less than the threshold number:

remove the first other write request from the first other computing device from the proposal requests to produce first updated proposal records;

interpret the first updated proposal records;

remove the second other write request from the second other computing device from the proposal requests to produce second updated proposal records;

interpret the second updated proposal records; and when interpretation of the first updated proposal records and the second updated proposal records both identify the computing device as having the threshold number of write requests in the first priority position of the updated proposal records, transmit, via the interface, finalize commands to the storage units.

8. The computing device of claim 1, wherein the processing module is further configured to:

receive, via the interface, a first proposal record of the proposal records from a first SU that is remotely located from the computing device within the DSN and a second proposal record of the proposal records from a second SU that is remotely located from the computing device and the first SU within the DSN.

9. A method for execution by a computing device, the method comprising:

transmitting, via an interface of the computing device that is configured to interface with a dispersed storage network (DSN), write requests for a set of encoded data slices to storage units (SUs) of a dispersed storage network (DSN) based on a write request process, wherein a data segment is dispersed error encoded to produce the set of encoded data slices, wherein a threshold number of encoded data slices provides for reconstruction of the data segment, wherein each write request of the write requests corresponds to a respective one data slice of the set of encoded data slices and is transmitted to a respective one SU of the SUs;

receiving, via the interface of the computing device, proposal records for a subset of the set of encoded data slices from at least some of the SUs, wherein a proposal record of the proposal records includes an ordered list of pending write requests including one of the write requests and other write request from other computing device;

interpreting the proposal records to determine whether the computing device or the other computing device has a threshold number of its respective write requests in a first priority position in the ordered list of pending write requests;

when neither of the computing device nor the other computing device has the threshold number of its respective write requests in the first priority position:

determining a number of missing proposal records;

determining whether either the computing device or the other computing device has an actual number of the first priority positions of the respective write requests that is more than the number of missing proposal records less than the threshold number;

when the other computing device has the actual number of the first priority positions of the respective write requests that is more than the number of missing proposal records less than the threshold number:

removing the other write request from the other computing device from the proposal requests to produce updated proposal records;

interpreting the updated proposal records to determine whether the computing device has the threshold number of write requests in the first priority position; and when the computing device has the threshold number of write requests in the first priority position of the updated proposal records, transmitting, via the interface of the computing device, finalize commands to the storage units.

10. The method of claim 9 further comprising:

transmitting, via the interface of the computing device, finalize commands to the storage units when the computing device has the threshold number of its respective write requests in the first priority position in the proposal records.

11. The method of claim 9 further comprising:

requesting a new set of proposal records from the SUs based on the write requests when both the computing device and the other computing device have the actual number of the first priority positions of the respective write requests that is equal to or less than the number of missing proposal records less than the threshold number.

12. The method of claim 9 further comprising:

aborting the write request process when both the computing device and the other computing device have the actual number of the first priority positions of the respective write requests that is equal to or less than the number of missing proposal records less than the threshold number.

13. The method of claim 9 further comprising:

transmitting, via the interface of the computing device, new write requests for the set of encoded data slices to SUs of the DSN based on another write request process.

14. The method of claim 9 further comprising:

when neither the computing device nor the other computing device has the actual number of the first priority positions of the respective write requests that is equal to or less than the number of missing proposal records less than the threshold number and when the other computing device's actual number plus the number of missing proposal records is less than the computing device's actual number plus the number missing proposal records:

removing the other write request from the other computing device from the proposal requests to produce other updated proposal records; and interpreting the other updated proposal records.

15. The method of claim 9 further comprising:

receiving, via the interface of the computing device, the proposal records for the subset of the set of encoded data slices from at least some of the SUs, wherein a first proposal record of the proposal records includes a first ordered list of pending write requests including one of the write requests and a first other write request from a first other computing device, and wherein a second proposal record of the proposal records includes a second ordered list of pending write requests including another one of the write requests and a second other write request from a second other computing device;

interpreting the proposal records to determine whether the computing device, the first other computing device, or the second other computing device has the threshold number of its respective write requests in a first priority position in the ordered list of pending write requests;

when none of the computing device, the first other computing device, or the second other computing device has the threshold number of its respective write requests in the first priority position:

determining the number of missing proposal records;

determining whether any of the computing device, the first other computing device, or the second other computing device has the actual number of the first priority positions of the respective write requests that is more than the number of missing proposal records less than the threshold number;

when each of the first other computing device and the second other computing device have the actual number of the first priority positions of the respective write requests that is more than the number of missing proposal records less than the threshold number:

removing the first other write request from the first other computing device from the proposal requests to produce first updated proposal records;

interpreting the first updated proposal records;

removing the second other write request from the second other computing device from the proposal requests to produce second updated proposal records;

interpreting the second updated proposal records; and when interpretation of the first updated proposal records and the second updated proposal records both identify the computing device as having the threshold number of write requests in the first priority position of the updated proposal records, transmitting, via the interface of the computing device, finalize commands to the storage units.

16. The method of claim 9 further comprising:

receiving, via the interface of the computing device, a first proposal record of the proposal records from a first SU that is remotely located from the computing device within the DSN and a second proposal record of the proposal records from a second SU that is remotely located from the computing device and the first SU within the DSN.

* * * * *